Feb. 10, 1931.    H. C. DOANE    1,791,807
TRANSMISSION AND IGNITION LOCK
Filed June 10, 1927

Inventor
Harry C. Doane
By Blackmore, Spencer & Hulse
Attorneys

Patented Feb. 10, 1931

1,791,807

UNITED STATES PATENT OFFICE

HARRY C. DOANE, OF FLINT, MICHIGAN, ASSIGNOR TO GENERAL MOTORS CORPORATION, OF DETROIT, MICHIGAN, A CORPORATION OF DELAWARE

TRANSMISSION AND IGNITION LOCK

Application filed June 10, 1927. Serial No. 197,912.

My invention relates to a combined transmission and ignition lock for motor vehicles and has for its principal object the provision of a dual lock in which the ignition may be locked at any time regardless of whether the transmission is in gear or in neutral.

It is very often considered desirable, in hilly countries, to leave the transmission in low or reverse gear when parking the vehicle on an incline. This is done so that in case the brakes should fail to prevent the car from running downhill, the motor, being connected with the rear wheels through the transmission, will act as an additional brake. When parking in this manner, some provision must be made for locking the car. In my invention this is accomplished by so constructing the transmission and ignition locks that the ignition may be locked when the transmission is in any position.

A second object is to so construct the transmission lock that when it is placed in locking position while the transmission is in any gear, it will not lock the transmission in that gear, but when an attempt is made to shift to any other gear, the transmission will be automatically locked in neutral, which it must necessarily pass through in order to be placed in any other position. It is usually considered undesirable to lock a transmission in gear because it is very difficult to move the vehicle in case of fire, etc.

Another object is to provide a hardened steel casing within which the combined locks may be housed to protect them from being tampered with by thieves.

A further object is to provide an ignition lock in which the movable contact member is resiliently held against the stationary contact members, thus compensating for wear and insuring a positive contact at all times when the ignition lock is in unlocked position.

A still further object is to provide a combined transmission and ignition lock assembly which is enclosed at its lower end and sealed to prevent the entry of the heavy transmission oil into the lock mechanism and subsequent inoperativeness due to poor electrical contact.

With these and other objects in view, my invention will be more clearly understood by referring to the specification and accompanying drawings, in which.

Figures 1, 2, 3:
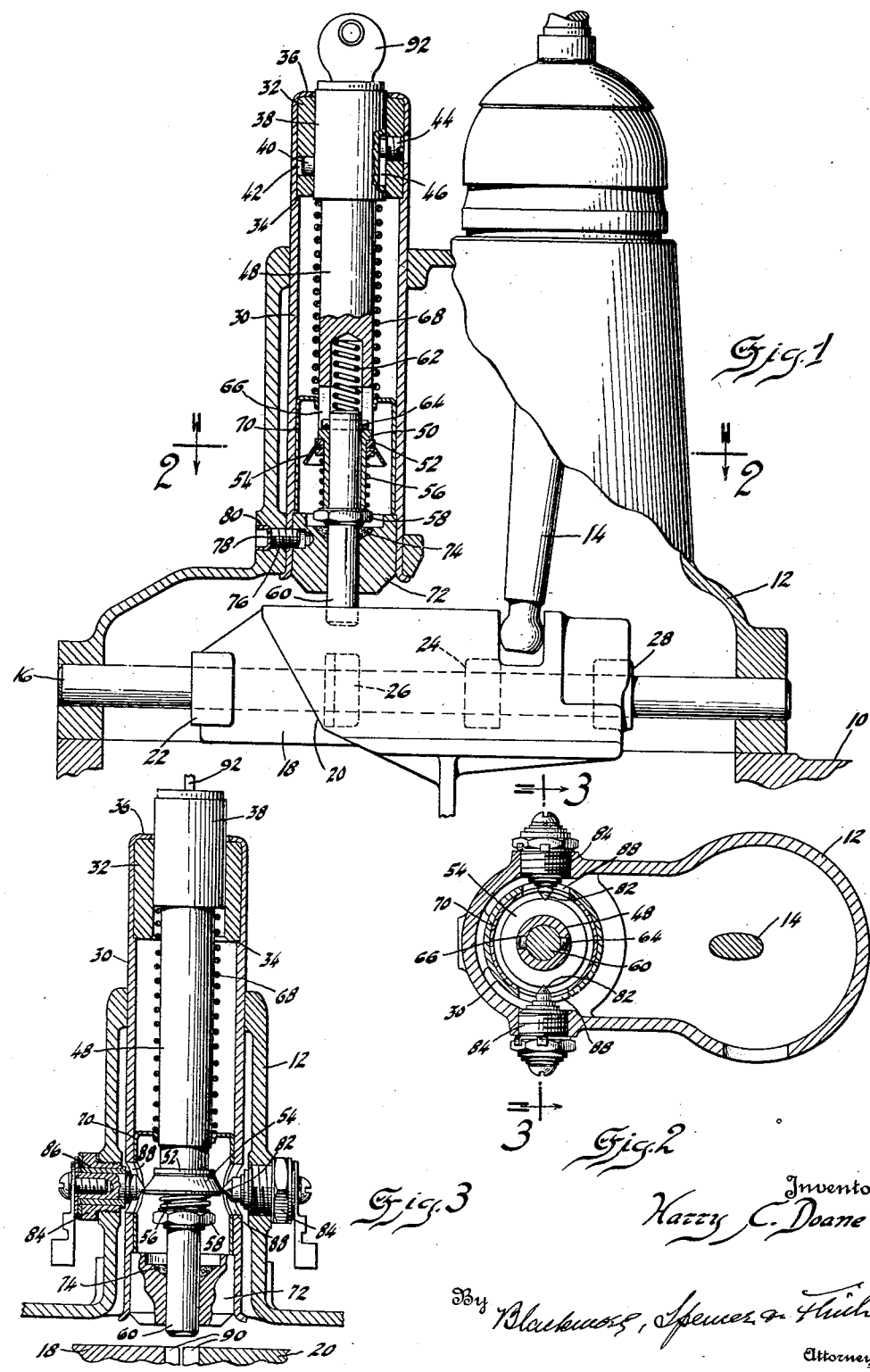
Figure 1 is a fragmentary longitudinal section view through a transmission, showing my improved transmission and ignition lock in connection therewith.
Figure 2 is a sectional view taken on the line 2—2 of Figure 1.
Figure 3 is a sectional view taken on the line 3—3 of Figure 2.

The numeral 10 indicates a transmission casing having a cover 12 in which is mounted the gear shift lever 14 in the usual manner. Held in the cover is a stationary shaft 16 on which are slidably mounted the gear shifting members 18 and 20. Member 18 is supported by bearings 22 and 24 and member 20 by bearings 26 and 28. In order to shift the transmission into any gear, the lever 14 is rocked to one side so that its lower end will engage the proper gear shifting member which may then be moved forward or backward to the desired position, where it is held by the conventional plunger and detent arrangement (not shown).

Mounted in the transmission cover is a hardened steel sleeve 30 containing the combined lock and ignition mechanism which is assembled in the sleeve before the latter is placed in the cover. At the upper end of the sleeve is a bushing 32 held against the shoulder 34 by the end of the sleeve which is rolled over as at 36. Within this bushing is a cylinder lock barrel 38 held in its locked position (as shown in Figure 1) by a spring urged pin 40 which fits into opening 42. The upward and downward movement of the lock barrel is limited by set screw 44 which engages slot 46. This also prevents rotation of the lock barrel. The lock barrel 38 is provided with an extension 48 which has a shoulder 50 against which is held a washer 52 of any suitable insulating material. Secured in this washer is a copper contact ring 54. The washer 52 is held against the shoulder 50 by spring 56 which abuts against a nut 58 threaded on the end of extension 48. The lower end of the extension 48 is bored out to receive a plunger 60 and a spring 62. A pin 64 held in the plunger 60 works in a slot 66 in extension 48 and limits the downward movement of plunger 60. It also serves to retract the plunger when the lock barrel is moved upwardly by the spring 68 which abuts against the shell 70 held in the sleeve 30 by closure 72. The closure is preferably provided with packing 74 surrounding the plunger 60 to prevent the entrance of the heavy transmission oil into the lock assembly. The sleeve 30 is held in the cover 12 by set screw 76 which is concealed and protected by the plug 78 pressed into the counterbore 80. The set screw 76 also serves to hold the closure 72 in the sleeve 30.

It will thus be seen that the whole lock assembly is contained inside the hardened steel shell and is protected from being tampered with by unauthorized persons.

Referring to Figure 3, after the sleeve has been secured in the cover, contact members 82 held in the threaded plugs 84 by insulating bushings 86, are assembled in place, passing through openings 88 in the sleeve 30 and shell 70. The contact members 82 are connected in series with the ignition circuit of the engine so that only when the contact ring 54 is against the contact members, will there be a closed circuit for the ignition system. When in unlocked position as shown in Figure 3, the contact ring 54 is held yieldingly against the contact members 82, thus insuring a good contact.

The operation of the locks is as follows. Let us assume that it is desired to lock the ignition and transmission while the transmission is in neutral. The lock barrel 38 is pressed down as far as it will go and the pin 40 then springs into the opening 42 holding the lock barrel in this position, as shown in Figure 1. This movement has broken the ignition circuit by moving the contact ring 54 away from the contact members 82, and has also permitted the plunger 60 to drop down into the semi-circular recesses 90 in the gear shifting members 18 and 20, thus preventing movement of the latter. To unlock the transmission and ignition circuit, the key 92 must be inserted in the lock and turned, thus retracting the pin 40 and permitting the spring 68 to force the lock barrel up as far as it can go. This movement brings the contact ring 54 against the contact members 82, closing the ignition circuit. The plunger 60 is pulled up out of the recesses 90 by the end of the slot 66 bearing against the pin 64. This of course permits movement of the gear shifting members.

Should it be desired to lock the ignition while the transmission is in gear, the barrel is pressed down as before, thus breaking the ignition circuit. Due to the fact that one of the gear shifting members 18 and 20 is out of neutral position, the plunger 60 is unable to drop into the recesses 90 and therefore is merely pressed against the top of one of the members 18 and 20 by the spring 62. However as soon as the transmission is shifted into neutral position, the recesses 90 will register, thus allowing the plunger 60 to be forced into place and thereby prevent any further shifting of the transmission.

The advantage of this is, that when the car is parked on a hill with the ignition locked and the transmission in gear, even though a thief should be able to tamper with the ignition system and get the engine running, he would not be able to get very far with the car as he would attract considerable attention by running the car continuously in low or reverse. As stated before, it would be utterly impossible for him to shift the transmission into any other gear.

It will be seen that my transmission lock will do anything that the usual type of transmission lock will do and in addition has the feature that the ignition may be locked while the transmission is in any gear, as well as neutral. In case of fire or any other emergency, should the vehicle be left locked with the transmission in gear, the transmission may be shifted into neutral by anyone, and then pushed out of the way. There is absolutely no danger of locking the transmission while the engine is running such as there is in some types of transmission locks, because in my invention, it is absolutely necessary that the ignition be turned off before the transmission is even in condition to be locked.

It is thought from the foregoing taken in connection with the accompanying drawing that the construction and operation of the device will be apparent to those skilled in the art, and that various changes in size, shape, and proportion and details of construction may be made without departing from the spirit and scope of the appended claims.

Having described my invention, I claim:

1. In combination with a transmission having transmission locking means, a contact ring axially movable on said locking means, contact members cooperating with said ring to provide an ignition lock, and a spring to resiliently hold said ring against said members when in unlocked position.

2. In a transmission lock, a movable member having a locking barrel, a plunger positioned to move axially in said member and adapted to lock the transmission, a lost motion connection between said member and plunger, comprising a slot and pin, resilient means tending to force said member and plunger away from each other, and a resiliently mounted ring attached to said movable member and forming an electric circuit breaking means.

3. In a transmission lock, a sleeve mounted at the transmission casing, locking mechanism mounted in said sleeve, a shell in said sleeve serving as a positioning means for said mechanism, a closure for one end of said sleeve and through which said mechanism passes, means for causing said mechanism to engage said transmission, said sleeve having a plurality of openings, electric terminals mounted at said openings, and a contact on said mechanism adapted to make and break the electric circuit in response to movements of said mechanism.

4. In a transmission lock, a sleeve mounted at the transmission casing, locking mechanism mounted in said sleeve, a shell in said sleeve serving as a positioning means for said mechanism, a closure for one end of said sleeve and through which said mechanism passes, means for causing said mechanism to engage said transmission, said sleeve having a plurality of openings, electric terminals mounted at said openings, and a resiliently mounted contact on said mechanism adapted to make and break the electric circuit in response to movements of said mechanism.

5. In a transmission lock, a sleeve mounted at the transmission casing, locking mechanism mounted in said sleeve, a shell in said sleeve serving as a positioning means for said mechanism, a closure for one end of said sleeve and through which said mechanism passes, means for causing said mechanism to engage said transmission, said mechanism carrying an electric contact adapted to make and break a circuit in response to movements of said mechanism, said contact comprising a ring spring pressed against a part of said mechanism.

6. In a transmission lock, a sleeve mounted at the transmission casing, locking mechanism mounted in said sleeve, a shell in said sleeve serving as a positioning means for said mechanism, a closure for one end of said sleeve and through which said mechanism passes, means for causing said mechanism to engage said transmission, said sleeve having a plurality of openings, electric terminals positioned at said openings, a contact mounted on said mechanism and adapted to move therewith to bridge said contacts to make an electric circuit or to move away therefrom to break said circuit, and a spring for pressing said contact against said mechanism.

7. In a transmission lock, a sleeve mounted in the transmission casing, a lock barrel having an extension rigidly secured thereto mounted in the sleeve, a shell mounted in the sleeve, a spring housed in the shell between the barrel and shell and constantly urging said barrel and extension out of said sleeve, a plunger connected to said extension by a lost motion connection, said plunger adapted to lock said transmission, resilient means urging said plunger and extension away from each other, and an ignition switch on said extension operated by the movement of said lock to locked or unlocked position.

In testimony whereof I affix my signature.

HARRY C. DOANE.